Figure 1:
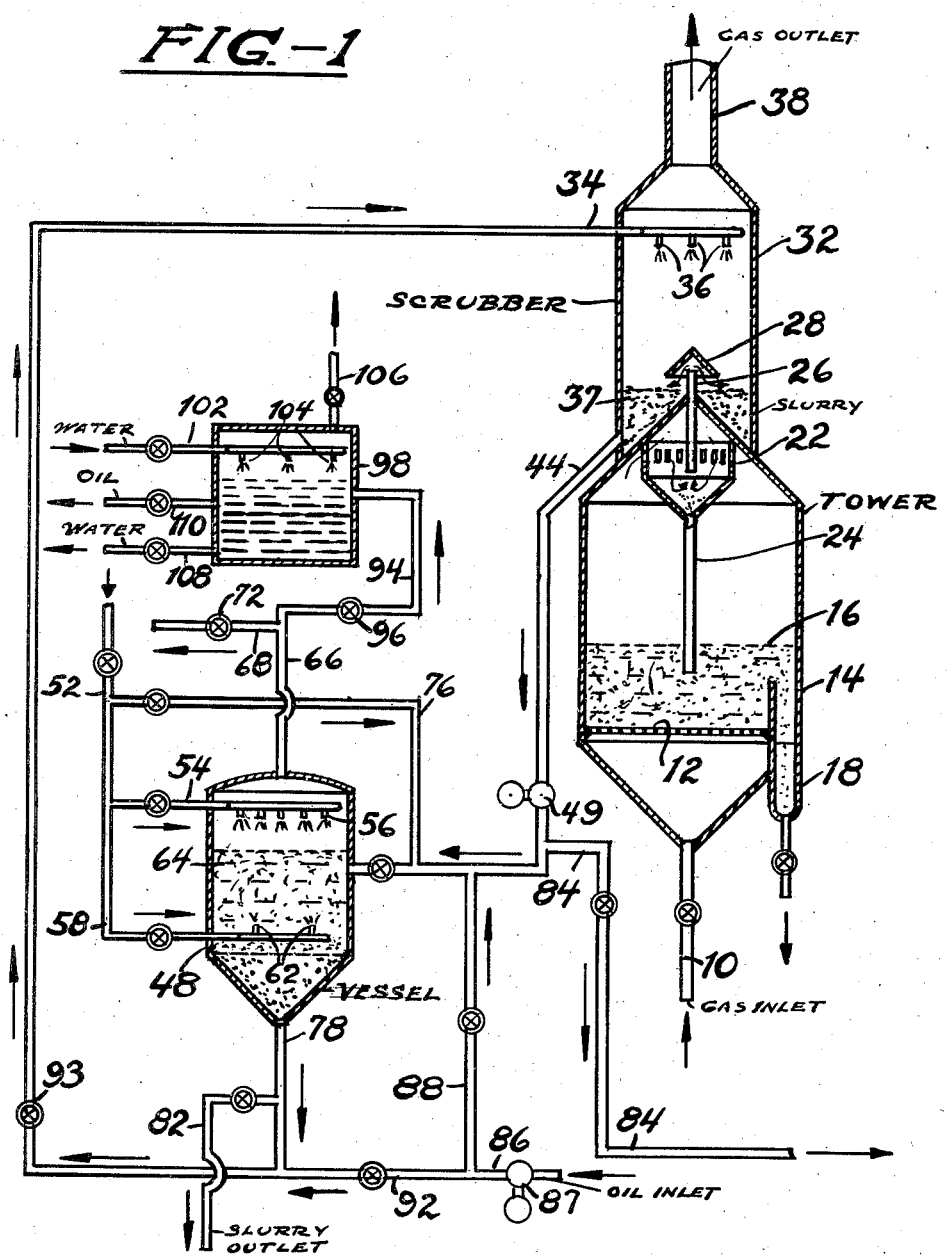

July 16, 1946.　　C. E. JAHNIG　　2,404,071
SCRUBBING DUST LADEN GASES
Filed Sept. 17, 1943　　2 Sheets-Sheet 1

Charles E. Jahnig Inventor
By Ph. Young Attorney

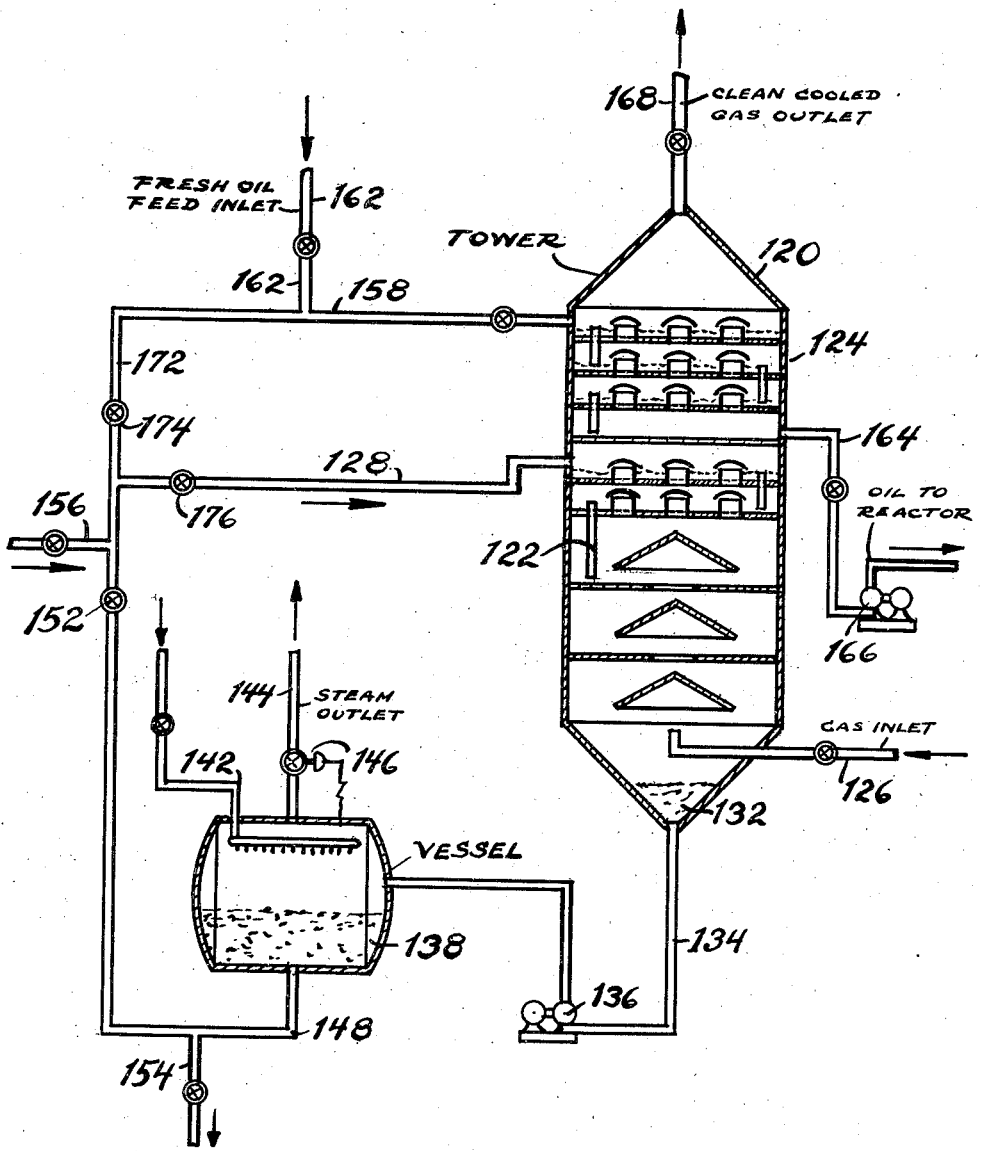

Patented July 16, 1946

2,404,071

UNITED STATES PATENT OFFICE 2,404,071

SCRUBBING DUST-LADEN GASES

Charles E. Jahnig, Roselle, N. J., assignor to Standard Oil Development Company, a corporation of Delaware Application September 17, 1943, Serial No. 502,720

13 Claims. (Cl. 196—52)

This invention relates to the removal of dust from high temperature gases, and more particularly, relates to removing dust or catalyst fines from regeneration gases.

In the catalytic conversion of hydrocarbons using powdered catalyst and the regeneration of the spent catalyst with regenerating gas by burning, there is a problem of the recovery of the powdered catalyst. To remove the bulk of the catalyst from the regeneration gases, cyclone separators or other separating means are used but there is some entrainment of the catalyst particles with the outgoing regeneration gases. Even where a Cottrell precipitator is used there is loss of catalyst by entrainment with the outgoing gases.

It is known to use an oil scrubber for the regeneration gases leaving the separating means to recover the powdered catalyst or contact material from the regeneration gases but the scrubbing oil must be relatively heavy to avoid excessive vaporization and loss of the oil. In cases where the oil feed to the conversion zone is not satisfactory, that is, if it is too light, it is necessary to provide a separate scrubbing oil which must be recirculated through the scrubber. Removing heat from the circulating oil stream is a serious problem because of the extremely poor heat transfer obtained with the heavy oil at a relatively low temperature.

According to my invention, the disadvantage of low heat transfer is overcome. Hot slurry from the scrubber is pumped into a contacting drum or vessel where liquid water or other suitable medium is introduced to directly contact the oil and cool the oil. The oil, when it is introduced into the contacting drum or vessel, is at a temperature above the boiling point of water at the existing pressure and steam is formed which is taken off the top of the contacting drum or vessel. If desired, the contacting drum or vessel may be maintained under superatmospheric pressure and steam is withdrawn from the drum under superatmospheric pressure and may be used where desired. The contacting drum or vessel may be maintained under subatmospheric pressure where extreme cooling of the slurry is desired.

Instead of vaporizing water under subatmospheric pressure to cool the scrubbing oil, it may be preferable to use a lower boiling medium, such as butane, in which case the flashing operation can be carried out at a higher pressure or the scrubbing oil may be cooled to a lower temperature. In general, however, the use of water is to be preferred because of its high latent heat of vaporization which makes possible the introduction of less cooling medium and thus keeps the volume of the apparatus at a low value. There are some cases, however, in which water cannot be used because of its effect on catalyst activity. In these cases the preferred coolant would be an easily vaporizable material such as light hydrocarbons, alcohols, ethers, etc.

The cooled slurry is recycled to the scrubbing tower. A portion of the slurry before being passed to the contacting drum or vessel may be withdrawn and passed to the reaction zone where hydrocarbons are converted in the presence of powdered catalyst. In this way, the recovered catalyst is returned to the system. Make-up scrubbing oil is added to the contacting drum to replace the amount of oil withdrawn in the slurry. The make-up oil may be feed oil or extraneous heavy oil. Instead of passing the withdrawn slurry to the reaction zone, a portion of all of the withdrawn slurry may be sent to the bottom of the fractionator into which the reaction products from the reaction zone are introduced. The oil slurry acts as a scrubbing medium for the reaction products, and bottoms from the fractionator may be returned to the reaction zone or a portion of the bottoms from the fractionator may be passed to the regeneration zone. Or the slurry may be withdrawn after it has passed through the contacting drum or vessel and the catalyst may be recovered by filtering, settling, or other known methods.

My invention is also useful for recovering sensible heat from high temperature gases.

In another form of my invention hot gases leaving the scrubbing zone are scrubbed with cooler oil to recover oil vapors from the gases.

In the drawings, the Figure 1 and 2 represent two forms of apparatus which may be used to carry out my invention.

Referring now to the drawings, the reference character 10 designates a line for conducting spent catalyst and a regenerating gas, such as air or other oxygen-containing gas, into the space below distribution plate 12 in a regeneration zone 14. Distribution plate 12 acts to evenly distribute the catalyst or contact material and air or regenerating gas across the area of the regeneration zone. The velocity of the regenerating gas is controlled to maintain a fluidized mass of solid particles in the regeneration zone 14, the fluidized mass having a level 16 similar to that of a boiling liquid.

The powdered catalyst or contact material is maintained in the regeneration zone for a time sufficient to substantially burn off most of the carbonaceous or other combustible deposit on the contact particles. Regenerated or contact material is withdrawn as a fluidized mass through withdrawal pipe 18 extending into the mass of fluidized particles above the distribution plate 12.

The regeneration gases pass upwardly through the regeneration zone 14 to a separating means diagrammatically shown in the drawings at 22. The separating means acts to remove the bulk of the catalyst from the regeneration gases and the separated catalyst particles are returned to the fluidized bed or mass through return pipe 24 which extends below the level 16 of the fluidized mass. The separating means 22 comprises any suitable separating means but preferably a plurality of cyclone separators is used.

If desired, the regeneration gases may be cooled before or after the separating means.

The regeneration gases, after having passed through the separating means 22, still contain entrained catalyst or contact particles, and the regeneration gases are passed through line 26 below a distributing plate 28 in the scrubbing tower 32. Suitable scrubbing oil is passed through line 34 and introduced into the upper portion of the scrubbing tower 32 by means of spray nozzles 36, or other distribution means. The scrubbing tower may be any liquid gas contact apparatus such as a bubble tower, a packed tower, or a spray tower as shown in the drawings.

The scrubbing oil passes downwardly countercurrent to the upflowing regeneration gases and the powdered material is scrubbed out of the regeneration gases as an oil slurry which is collected at the base of the scrubbing tower 37. The cooled and scrubbed regeneration gases leave the scrubbing tower 32 through line 38 and are passed to the atmosphere, or further processed as desired. For example, oil vapors picked up by the gas in passing through the scrubber may be recovered by contacting with relatively cold oil or by scrubbing with water.

The hot oil slurry is withdrawn from the bottom of the scrubbing tower 32 through line 44 and is pumped into contacting drum or vessel 48 by pump 49. Water or other suitable medium is passed through line 52 and is introduced into the upper portion of the contacting drum or vessel 48 through line 54 provided with sprays 56. Another line 58 communicates with inlet line 52 for introducing water into the body of the oil slurry in the contacting drum or vessel. Line 58 is provided with upwardly directed nozzles 62 for introducing liquid water directly into the body of oil slurry 64.

The oil slurry is at a temperature higher than the boiling point of water at the existing pressure and as a result, water is vaporized. It will be seen that in the contacting drum or vessel 48 the oil slurry and water are directly contacted and the oil slurry is cooled by the vaporization of water. Steam is withdrawn overhead from the contacting drum or vessel through line 66. If desired, the contacting drum or vessel 48 is maintained under superatmospheric pressure and under these conditions steam under superatmospheric pressure is produced which is withdrawn through the branch line 68 having valve 72.

A portion of the cooling water passing through line 52 may be passed through line 76 and the water introduced into line 44 for direct mixing with the hot oil slurry before it is introduced into the contacting drum or vessel 48.

The cooled oil slurry is withdrawn from the bottom of the contacting drum or vessel 48 through line 78 and is recycled through line 34 as the scrubbing medium for the scrubbing tower 32. A portion of the cooled oil slurry may be withdrawn from line 78 and removed from the system through line 82. To recover the catalyst from the slurry withdrawn through line 82 the slurry may be filtered or allowed to settle, or other methods of separating may be used. In certain cases it may be desirable to return this slurry to another point in the system.

Hot oil slurry containing a desired concentration of recovered catalyst or powdered material is withdrawn from line 44 through line 84 and recycled to the reaction zone where hydrocarbons are being converted in the presence of powdered catalyst. In this way, the recovered catalyst is returned to the system. Instead of recycling or returning the oil slurry to the reaction zone, the solid particles may be recovered from the oil slurry leaving tower 32 by settling to form a sludge and then dispersing the sludge in the oil feed to the reaction zone.

To replace the oil withdrawn in the slurry, make-up oil is passed through line 86 by pump 87 and a portion thereof passed through line 88 for introduction into the hot oil slurry line 44 passing to the contacting drum or vessel 48. Another portion of the make-up oil may be passed through line 92 for admixture with the cooled oil slurry withdrawn from the contacting drum or vessel 48 through line 78 and this mixture recycled through line 34 to the scrubbing tower 32. Where the contacting vessel is under superatmospheric pressure, line 34 has a pressure reducing valve 93 for reducing the pressure on the oil to be recycled to scrubbing tower 32.

Where the contacting drum or vessel 48 is maintained at atmospheric or subatmospheric pressures, it may be desirable to recover oil vapors from the steam leaving the contacting drum through line 66. In this case, the valve 72 in line 68 is closed and the steam is passed through line 94 having a valve 96. The steam is introduced into a second scrubbing zone 98 into which water is introduced through line 102 having spray nozzles 104 in the upper portion of the scrubbing tower 98. The steam is condensed and forms a lower layer in the scrubbing zone 98 and recovered oil forms the upper layer. Water is withdrawn through line 108 and recovered oil is withdrawn through line 110. The water withdrawn through line 108 may be used as the cooling medium in the contacting drum or vessel 48. The recovered oil in line 110 may be removed from the system and returned to the reaction zone or used as part of the make-up oil for the scrubbing oil. If preferred, indirect cooling can be used in vessel 98.

In some cases it will be desirable to remove oil from the steam and this can be accomplished by the usual methods.

As the temperature of the regeneration gas leaving the scrubbing tower 32 may be rather high when making high pressure steam, some oil vapors will be carried out with the gas. These vapors can be recovered by cooling the gas by contacting with water, or the oil vapors can be recovered by scrubbing the gas with another heavy oil. For example, when applying this invention to a fluid catalytic plant for gas oil conversion, the gas oil feed may be used for scrubbing to recover oil vapors lost from the first scrubber 32. The entire operation can be carried out in a single tower, the bottom section of which employs recirculation of a heavy oil for steam generation as described previously. In the top of the same tower, the gas oil feed is contacted with the partially cooled regeneration gas to further cool it and absorb oil vapors carried out of the bottom section.

This form of my invention is shown in Fig. 2 in which reference character 120 designates a tower or vessel having a scrubbing section 122 in the lower part thereof and an oil recovery section 124 in the upper part thereof. High temperature gases at about 600°–1000° F. are passed through line 126 and introduced into the bottom portion of the scrubbing section 122 of the tower 120. Relatively high boiling scrubbing liquid, such as oil, is introduced into the top of the scrubbing section 122 through line 128. The scrubbing section 122 is provided with discs and doughnuts to provide intimate contact between the scrubbing liquid and the hot gases. Other scrubbing towers, such as packed or spray towers, may be used.

If the high temperature gases contain dust or finely divided material which it is desired to recover, the scrubbing oil washes out the dust or finely divided material and forms a slurry at the bottom of the scrubbing section as shown at 132. My invention is used for recovering heat from the high temperature gases and also to recover finely divided solids in the high temperature gases. The scrubbing oil containing the scrubbed out solid particles is withdrawn from the bottom of the scrubbing section through line 134 and passed by pump 136 to a heat exchanger, such as steam generating vessel 138 similar to that described in connection with Fig. 1 for cooling the scrubbing liquid before recycling it. Instead of using water, other easily vaporizable liquids may be used.

Ordinarily, water will be the preferred liquid and the water is introduced into the vessel 138 through line 142. Steam which is generated is withdrawn through line 144 provided with a pressure control device 146. The scrubbing oil is cooled by direct contact with the water and the cooled oil slurry is withdrawn from the bottom of the vessel 138 through line 148 and recycled to the top of the scrubbing section 122 through line 128.

The steam pressure which can be attained will depend on the temperature maintained in the circulating oil stream passing to the steam generating vessel 138 in Fig. 2 and vessel 48 in Fig. 1. As high pressure steam is generally more useful, the temperature of the scrubbing oil passing to the steam generating vessels in Figs. 1 and 2 will normally be around 300°–450° F. and therefore the scrubbing oil is selected to have a relatively high boiling range to minimize loss by vaporization.

The steam pressure obtainable with my invention will generally be from 35 to 200 lbs./sq. in. Depending on the use to which the steam is put, it may be desirable to remove oil vapors from it and this can be accomplished by known means.

Line 148 is provided with a pressure reducing valve 152. When the desired concentration of solids is obtained in the slurry, the slurry may be withdrawn through line 154 and fresh make-up scrubbing liquid is introduced into line 148 through line 156. The oil slurry may be filtered or passed to a settling vessel for recovery of the solid particles. In an operation such as catalytic cracking of hydrocarbons, the solid particles suspended in the gas are catalyst particles which it is desired to recover and these catalyst particles are separated by filtering or settling from the slurry as above described.

The high temperature gases during passage through the scrubbing zone have their temperature reduced but they are still at a relatively high temperature and contain some vaporized scrubbing oil. To recover the oil vapors the hot gases are passed through the second scrubbing zone 124 arranged in the upper part of the vessel 120. A second cool scrubbing oil is introduced into the upper part of the scrubbing section 124 through line 158. The scrubbing section 124 may be any suitable scrubbing apparatus such as a bubble cap construction or other liquid-gas contacting device.

In the catalytic conversion of hydrocarbons the relatively cold scrubbing oil used in the scrubbing section 124 is preferably fresh oil feed, such as a relatively heavy gas oil, which is introduced into the system through line 162. But other scrubbing oils may be used. The cool oil flows downwardly through the scrubbing section 124 and intimately contacts the hot gases as they pass upwardly through this section. The fresh oil feed recovers scrubbing oil vapors from the gases and at the same time has its temperature raised. The oil feed is withdrawn from the bottom portion of the section 124 through line 164 provided with a pump 166 for passing the oil feed to a catalytic conversion apparatus not shown. By recovering scrubbing oil vapors, the oil loss is reduced to a reasonable value.

The cooled and clean gases leave the top of tower 120 through line 168.

Instead of using oil in the upper scrubbing section 124, it is within the contemplation of my invention to use water as a scrubbing medium and the condensed oil is recovered from the water stream. Another method comprises indirectly cooling the gases in the top of the tower 120 to condense the oil vapors and recover them as liquid. Instead of adding enough water to cool the gases to condense water, the introduced water may be used to cool by humidification, in which case the separation of oil from water is eliminated and condensed oil is recovered.

Line 172 forms a continuation of line 148 and permits passage of scrubbing oil to section 124. Valve 174 is provided in line 172 and valve 176 is provided in line 128 for controlling the flow of the streams as desired.

A specific example for removing regenerated catalyst entrained in hot regeneration gases will now be given in connection with Fig. 1. However, the invention is not to be limited to this example as different temperatures and pressures may be used in recovering regenerated catalyst particles or recovering other finely divided particles from hot gaseous fluids.

During the regeneration in the regeneration zone 14 the temperature is about 1000° to 1200° F. The regeneration gases or flue gas introduced into the scrubbing tower 32 may be at a temperature of about 1000° F. but they may be cooled and introduced at a lower temperature. The scrubbing oil introduced through line 34 has a boiling range of about 550° F. to 900° F. The temperature of the scrubbing oil is about 340° F. and about 50 gallons of scrubbing oil are used per 1000 cubic feet (standard) of flue gas. The cooled and scrubbed regeneration gases leave the scrubbing tower 32 through line 38 at a temperature of about 350° F.

The oil slurry passing through line 44 is at a temperature of about 400° F. and it is introduced into the contacting drum or vessel 48 at this temperature. The water passing to the contacting drum or vessel 48 is at a temperature of about 300° F. and about 14 pounds of water are introduced into the contacting drum or vessel for each 1000 cubic feet (standard) of regeneration gas scrubbed.

With the contacting drum or vessel 48 maintained under 100 lbs./sq. in. pressure, the steam produced and passing through line 66 is at a temperature of about 338° F. The cooled slurry withdrawn from the contacting drum or vessel 48 through line 78 is at about this temperature.

The scrubbing oil and slurry formed in the initial stages of the process are recycled to the scrubbing tower 32 until a suitable concentration of catalyst or powdered material is obtained. The slurry withdrawn through line 84 has a concentration of about 0.5 to 2.0 lbs. of catalyst per gallon of oil.

The process in connection with Fig. 2 is substantially the same as above given except that it is an improvement thereover and there is less loss of scrubbing oil in the gases due to the second scrubbing step with cooler oil in scrubbing zone 124.

While I have shown two forms of apparatus in the drawings, and have given one specific example of one operation in the specification, it is to be understood that these are by way of example only and changes and modifications may be made without departing from the spirit of my invention.

I claim:

1. A method of recovering finely divided particles from high temperature gases which comprises passing dust laden gases into the lower portion of a scrubbing zone, introducing a liquid scrubbing medium into the upper portion of the scrubbing zone so that the downflowing scrubbing medium scrubs out the dust in the gases to form a slurry, removing the slurry from the bottom of the scrubbing zone, the slurry being at a relatively high temperature, directly contacting the hot slurry with an easily vaporizable liquid in a contacting zone to cool the slurry and to form vapor and recycling at least part of the cooled slurry to said scrubbing zone.

2. A method according to claim 1 wherein the liquid scrubbing medium is oil.

3. A method according to claim 1 wherein the easily vaporizable liquid is water and the vapor formed is steam.

4. A method according to claim 1 wherein the easily vaporizable liquid is a light hydrocarbon liquid.

5. A method according to claim 1 wherein at least part of the withdrawn slurry is withdrawn from the system.

6. A method as defined in claim 1 wherein at least part of the slurry is recycled to said scrubbing zone until a desired concentration of solid particles in scrubbing liquid is obtained and then at least a part of the resulting slurry is withdrawn from the scrubbing system and the withdrawn liquid medium is replaced by fresh make-up scrubbing liquid medium.

7. In a method for scrubbing high temperature gases containing entrained solid particles wherein the hot gases are scrubbed with a relatively heavy oil to form an oil slurry containing recovered solid particles, the steps of cooling the hot recovered oil slurry by directly contacting the oil slurry with an easily vaporizable liquid in a contacting zone and recycling the cooled oil slurry to the scrubbing zone.

8. In a method according to claim 7 wherein the easily vaporizable liquid is water.

9. In a method according to claim 7 wherein the easily vaporizable liquid is a relatively low boiling hydrocarbon liquid.

10. A method of recovering entrained catalyst particles from hot regeneration gases which comprises scrubbing hot catalyst-containing regeneration gases with a scrubbing oil, recovering a hot oil slurry containing the catalyst, cooling the oil slurry by direct contact with an easily vaporizable liquid and recycling at least part of the cooled oil slurry to the scrubbing step.

11. A method according to claim 10 wherein the easily vaporizable liquid is water.

12. A method of recovering entrained catalyst particles from hot regeneration gases which comprises scrubbing hot catalyst-containing regeneration gases with a scrubbing oil, recovering a hot oil slurry containing the catalyst, cooling the oil slurry by direct contact with water and recycling a part of the cooled oil slurry to the scrubbing step and withdrawing at least another part of the oil slurry, allowing the withdrawn slurry to stand and form a sludge of catalyst particles, separating the sludge and dispersing it in hydrocarbon oil feed for a catalytic conversion operation.

13. A method according to claim 1 wherein oil is recovered from the gases leaving said scrubbing zone by scrubbing with a relatively cold scrubbing medium.

CHARLES E. JAHNIG.